United States Patent [19]
Marsico, Jr. et al.

[11] 3,760,083
[45] Sept. 18, 1973

[54] A METHOD FOR THE USE OF 5-AMINO-3-ETHYL-1-(M-FLUOROPHENYL)-4-PYRAZOLECARBOXAMIDE

[75] Inventors: Joseph William Marsico, Jr., Pearl River; Leon Goldman, Nanuet, both of N.Y.

[73] Assignee: American Cyanamid Company, Stamford, Conn.

[22] Filed: May 1, 1972

[21] Appl. No.: 248,991

[52] U.S. Cl. ............................. 424/273, 260/310 R
[51] Int. Cl. ............................................. A01k 27/00
[58] Field of Search ................ 424/273; 260/310 R

[56] References Cited
UNITED STATES PATENTS

| | | | |
|---|---|---|---|
| 3,169,091 | 2/1965 | Gordon et al. | 260/310 R |
| 3,277,100 | 10/1966 | Dickinson | 260/310 R |
| 3,398,158 | 8/1968 | Fusco et al. | 260/310 R |

*Primary Examiner*—Stanley J. Friedman
*Attorney*—Ernest Y. Miller

[57] ABSTRACT

The compound 5-amino-3-ethyl-1-(m-fluorophenyl)-4-pyrazolecarboxamide and compositions with a pharmaceutically acceptable carrier are described. The compositions are useful as anti-psychoneurotic agents in warm-blooded animals.

3 Claims, No Drawings

METHOD FOR THE USE OF 5-AMINO-3-ETHYL-1-(M-FLUOROPHENYL)-4-PYRAZOLECARBOXAMIDE

DESCRIPTION OF THE INVENTION

The novel compound of this invention is 5-amino-3-ethyl-1-(m-fluorophenyl)-4-pyrazolecarboxamide of the following formula:

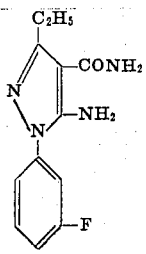

and non-toxic acid-addition salts with acids such as hydrobromic, hydrochloric, phosphoric, sulfuric, citric, tartaric and the like. It is a colorless crystalline solid which is soluble in organic solvents such as methanol, ethanol, acetone, ethyl acetate, benzene, propylene glycol and the like, but only very slightly soluble in water. The salts are soluble in water and generally in hydroxylic solvents.

The active compound of the present invention is prepared by the reaction sequence shown below:

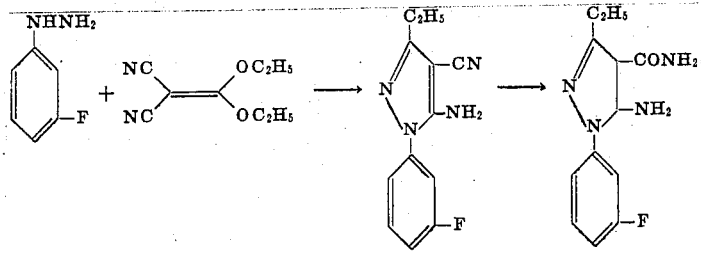

Thus, m-fluorophenylhydrazine is condensed with (1-ethoxypropylidene)malononitrile in an organic solvent such as ethanol to yield 5-amino-3-ethyl-1-(m-fluorophenyl)-4-pyrazolecarbonitrile which is hydrolyzed to produce the desired 5-amino-3-ethyl-1-(m-fluoro-phenyl)-4-pyrazolecarboxamide. m-Fluorophenylhydrazine may be used as the free base in the reaction, or may be generated in situ by utilizing a mixture of m-fluorophenylhydrazine hydrochloride and sodium acetate. The hydrolysis of the carbonitrile to the carboxamide may be accomplished with alkali such as sodium hydroxide or with acid such as concentrated sulfuric acid.

The 5-amino-3-ethyl-1-(m-fluorophenyl)-4-pyrazolecarboxamide of the present invention is highly active in the treatment of psychoneurosis in warm-blooded animals. It is useful in doses ranging from about 1 to 100 mg. per kilogram per day of warm-blooded animal. The preferred range of dose is usually 1 to 50 mg. per kilogram per day.

For therapeutic administration, the 5-amino-3-ethyl-1-(m-fluorophenyl)-4-pyrazolecarboxamide of this invention may be incorporated with excipients and used, for example, in the form of tablets, dragees, capsules, suppositories, liquids, elixirs, emulsions, suspensions, syrups, chocolate, candy, wafers, chewing gum, solutions for parenteral administration, or the like. Such compositions and preparations should contain at least 0.1 percent of 5-amino-3-ethyl-1-(m-fluorophenyl)-4-pyrazolecarboxamide. The percentage in the composition and preparations may, of course, be varied, and may conveniently be between about 2 and 60 percent or more of the weight of the unit. The amount of 5-amino-3-ethyl-1-(m-fluorophenyl)-4-pyrazolecarboxamide in such therapeutically useful compositions or preparations is such that a suitable dosage will be obtained. This dosage can also be obtained by the use of sustained release preparations. Preferred compositions or preparations according to the present invention are prepared so that a dosage unit form contains between about 1 and about 250 milligrams of the 5-amino-3-ethyl-1-(m-fluorophenyl)-4-pyrazolecarboxamide.

The pharmaceutical preparations such as tablets, pills, dragees, and the like may contain the following: a binder such as gum tragacanth, acacia corn starch, or gelatin; a disintegrating agent such as corn starch, potato starch, alginic acid, or the like; a lubricant such as stearic acid, magnesium stearate, talc, or the like; a sweetening agent such as sucaryl or saccharin may be added, as well as flavoring such as peppermint, oil of wintergreen or cherry flavoring.

The 5-amino-3-ethyl-1-(m-fluorophenyl)-4-pyrazolecarboxamide is a valuable anti-psychoneurotic agent of low toxicity. It has a similar profile of activity on the central nervous system of warm-blooded animals as does a reference drug such as chlordiazepoxide; namely, depressant activity as measured by impairment of rod-walking ability (ataxic effect), reduction of locomotor activity, protection against strychnine shock and protection against electroshock.

For measurement of ataxic effect, compounds are administered intraperitoneally in a 2 percent starch vehicle to groups of six mice at three or more graded dose levels. At 15-minute and 30-minute intervals after treatment, each animal is placed on the midpoint of a horizontal steel rod (1.55 cm. in diameter and about 6 dm. in length), positioned 45.7 cm. above the surface of the table, and forced to walk toward a platform at either end of the rod. The criterion of inability to perform this act is consistent slipping to the side or falling off the rod. The effective dose for reduced rod-walking ability ($RWD_{50}$) is calculated or approximated from the data, and the time of peak effect is estimated from the data. The compound 5-amino-3-ethyl-1-(m-fluorophenyl)-4-pyrazolecarboxamide was found to have $RWD_{50}$ of 54 mg./kg. of body weight. Chlordiazepoxide, a clinically active anti-psychoneurotic ring, had $RWD_{50}$ of 16 mg./kg. of body weight.

To determine reduction of locomotor activity one-half of the $RWD_{50}$ dose is given intraperitoneally to each mouse in groups of five. At the time of peak effect, as determined above, each group of mice is put into the actophotometer for a period of five minutes and the motor activity counts were recorded and compared to controls. The compound is administered to additional groups of five mice at graded doses and tested similarly. The dose ($MDD_{50}$) that caused a 50 percent reduction in motor activity is estimated. The 5-amino-3-ethyl-1-(m-fluorophenyl)-4-pyrazolecarboxamide was found to have $MDD_{50}$ of 28 mg./kg. of body weight. Chlordiazepoxide had $MDD_{50}$ of 28 mg./kg. of body weight.

One measure of depressant activity is the ability to prevent convulsive seizures in warm-blooded animals, e.g., mice, caused by strychnine sulfate [H. M. Hanson and C. A. Stone, "Animal and Clinical Pharmacological Techniques in Drug Evaluation," Vol. I, J. H. Nodine and P. E. Siegler, Eds., Yearbook Medical Publishers, Inc., Chicago, Ill., 1964, p. 317]. Graded dose levels of the compounds are administered intraperitoneally in a 2 percent aqueous starch medium to groups of 10 mice at each dose. Strychnine sulfate, dissolved in aqueous saline, is administered subcutaneously at doses estimated to cause toxic extensor seizures in 95 percent of the mice (0.82 milligrams per kilogram of body weight). Strychnine sulfate is administered 30 minutes after drug treatment. The median effective dose ($SP_{50}$) is calculated by the method of J. T. Litchfield and F. Wilcoxon, "A Simplified Method of Evaluating Dose-effect Experiments," *Journal of Pharmacology & Experimental Therapeutics*, Vol. 96, pages 99–113 (1949). The 5-amino-3-ethyl-1-(m-fluorophenyl)-4-pyrazolecarboxamide was found to have $SP_{50}$ of 12 mg./kg. of body weight. Chlordiazepoxide had $SP_{50}$ of 5 mg./kg.

Another measure of depressant activity is the ability to prevent convulsive seizures caused by electroshock. Compounds are administered intraperitoneally to groups of 10 mice at each of several graded dose levels. Thirty minutes later, mice are subjected to maximal electroshock (60 cycle, 50 mA, 0.2 seconds) via corneal electrodes. The dose ($EP_{50}$) which protects 50 percent of the mice from tonic extensor seizures is calculated. The 5-amino-3-ethyl-1-(m-fluorophenyl)-4-pyrazolecarboxamide was found to have $EP_{50}$ of 38 mg./kg. of body weight. Chlordiazepoxide had $EP_{50}$ of 15 mg./kg. of body weight.

SPECIFIC DESCRIPTION

The invention will be described in greater detail in conjunction with the following specific examples showing preparation of the compound of the invention and its use in various formulations.

EXAMPLE 1

Preparation of 5-Amino-3-ethyl-1-(m-fluorophenyl)-4-pyrazolecarbonitrile

A mixture of 24.4 g. of m-fluorophenylhydrazine hydrochloride, 22.5 g. of (1-ethoxypropylidene)-malononitrile and 12.3 g. of anhydrous sodium acetate in 300 ml. of absolute ethanol is refluxed for 23 hours, cooled and filtered. The filtrate is evaporated under reduced pressure to give a brown gummy residue. Crystallization from benzene gives, after filtration and washing with benzene, 22.2 g. of light tan crystals, melting point 128°–131°C. Recrystallization of a 5.00 g. sample from 50 ml. of benzene using activated charcoal gives 3.24 g. of 5-amino-3-ethyl-1-(m-fluorophenyl)-4-pyrazolecarbonitrile as colorless crystals, melting point 130°–132°C.

EXAMPLE 2

Preparation of 5-Amino-3-ethyl-1-(m-fluorophenyl)-4-pyrazolecarboxamide

A mixture of 6.50 g. of 5-amino-3-ethyl-1-(m-fluorophenyl)-4-pyrazolecarbonitrile, 140 ml. of 2N sodium hydroxide and 140 ml. of absolute ethanol is heated under reflux for 6.5 hours and then evaporated under reduced pressure until an oil separates. A few drops of ethanol are added and crystallization occurs. After chilling, the nearly colorless crystals are removed by filtration, washed with water and air-dried to give 5.25 g. of product, melting point 114°–116°C. The crystals are dissolved in dichloromethane and chromatographed over silica gel. The column is eluted with ether (200 ml. cuts) and cuts 3–9 are combined and the solvent is removed by evaporation under reduced pressure. The residual crystalline solid (4.37 g.) is recrystallized from acetone-hexane to give 2.79 g. of 5-amino-3-ethyl-1-(m-fluorophenyl)-4-pyrazolecarboxamide as colorless crystals, melting point 124.5°–126°C.

EXAMPLE 3

Preparation of 50 mg. Tablets

| Per Tablet | | For 10,000 Tablets |
|---|---|---|
| 0.050 g. | 5-Amino-3-ethyl-1-(m-fluorophenyl)-4-pyrazolecarboxamide | 500 g. |
| 0.080 | Lactose | 800 |
| 0.010 | Corn Starch (For Mix) | 100 |
| 0.008 | Corn Starch (For Paste) | 80 |
| 0.148 g. (total) | | (total) 1480 g. |
| 0.002 g. | Magnesium Stearate | 20 g. |
| 0.150 g. (total) | | (total) 1500 g. |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1 percent magnesium stearate and compressed into tablets in a suitable tableting machine.

EXAMPLE 4

Preparation of Oral Syrup

| Ingredient | Amount |
|---|---|
| Active ingredient: 5-Amino-3-ethyl-1-(m-fluorophenyl)-4-pyrazole-carboxamide | 500 mg. |
| Sorbitol solution (70% N.F.) | 40 ml. |
| Sodium benzoate | 150 mg. |
| Saccharin | 10 mg. |
| Red Dye (F.D. & C. No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates, or tartrates may be added as buffers. Preservatives may include the parabens, sorbic acid and the like and other flavors and dyes may be used in place of those listed above.

EXAMPLE 5

Preparation of Parenteral Solution

In a solution of 700 ml. of propylene glycol and 200 ml. of water for injection is dissolved 20.0 g. of 5-amino-3-ethyl-1-(m-fluorophenyl)-4-pyrazolecarboxamide with stirring. After dissolution is complete, hydrochloric acid is added to adjust the pH to 5.5 and the volume is made up to 1000 ml. with distilled water. The formulation is filtered through a 0.22 micron sterilizing filter, filled into 5.0 ml. ampoules, each containing 2.0 ml. (representing 40 mg. of drug), and sealed under nitrogen.

EXAMPLE 6

A comparison of the present compound with related compounds in the various activities is shown in the following table.

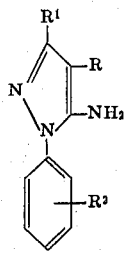

| R | R¹ | R² | CNS activity | | | |
|---|---|---|---|---|---|---|
|   |    |    | RWD | MDD | SP | EP |
| $CONH_2$ | Et | m-F | 54 | 28 | 12 | 38 |
| CN | Et | m-F | >100 | >50 | >50 | >50 |
| $CONH_2$ | H | m-F | --- | >000 | 60 | >100 |
| $CONH_2$ | Me | m-F | >100 | >50 | 11 | >50 |
| $CONH_2$ | n-Pr | m-F | --- | >000 | 20 | >100 |
| $CONH_2$ | Et | p-F | No CNS depression¹ | | | |
| $CONH_2$ | H | H | --- | >000 | 35 | >100 |
| $CONH_2$ | H | p-F | No CNS symptoms¹ | | | |
| $CONH_2$ | H | m-Cl | --- | >000 | 38 | >100 |
| $CONH_2$ | H | p-Cl | >100 | >50 | 8 | >50 |
| $CONH_2$ | H | p-Br | >100 | >50 | 19 | >50 |
| $CONH_2$ | Me | H | --- | >100 | 54 | >100 |
| CN | Me | H | --- | >100 | >100 | >100 |
| CN | Et | H | --- | >100 | 58 | >100 |
| CN | Et | m-F | >100 | >50 | >50 | >50 |
| Chlordiazepoxide | | | 16 | 28 | 5 | 15 |

¹ In preliminary observations screen.

In general, the first compound (present invention) is superior to the other compounds in most areas of CNS activity.

We claim:

1. A method of treating psychoneurosis in a warm-blooded animal which comprises administering internally to said warm-blooded animal a therapeutic composition of an effective amount of 5-amino-3-ethyl-1-(m-fluorophenyl)-4-pyrazolecarboxamide or a non-toxic acid addition salt thereof, in association with a pharmaceutically acceptable carrier.

2. A method in accordance with claim 1, wherein the therapeutic composition contains 5-amino-3-ethyl-1-(m-fluorophenyl)-4-pyrazolecarboxamide.

3. A method in accordance with claim 1, wherein the non-toxic acid addition salt is 5-amino-3-ethyl-1-(m-fluorophenyl)-4-pyrazolecarboxamide hydrochloride.

* * * * *